(12) United States Patent
McCormick

(10) Patent No.: US 10,204,507 B2
(45) Date of Patent: Feb. 12, 2019

(54) USER-CONFIGURABLE WEATHER WARNING APPARATUS

(75) Inventor: Allan McCormick, La Crescent, MN (US)

(73) Assignee: La Crosse Technology, Ltd., La Crosse, WI (US)

( * ) Notice: Subject to any disclaimer, the term of this patent is extended or adjusted under 35 U.S.C. 154(b) by 79 days.

(21) Appl. No.: 13/594,109

(22) Filed: Aug. 24, 2012

(65) Prior Publication Data

US 2014/0055272 A1 Feb. 27, 2014

(51) Int. Cl.
  *G01W 1/10* (2006.01)
  *G08B 21/10* (2006.01)
  *G08B 27/00* (2006.01)

(52) U.S. Cl.
  CPC ............. *G08B 27/008* (2013.01); *G01W 1/10* (2013.01); *G08B 21/10* (2013.01); *Y02A 50/12* (2018.01)

(58) Field of Classification Search
  USPC ........ 340/601, 539.1, 539.21; 455/185, 227; 370/293, 278, 282
  See application file for complete search history.

(56) References Cited

U.S. PATENT DOCUMENTS

| | | | | |
|---|---|---|---|---|
| 3,603,951 A | * | 9/1971 | Bracken ................. | G01W 1/06 340/311.2 |
| 5,781,852 A | * | 7/1998 | Gropper ................. | G08B 21/10 455/181.1 |
| 5,815,252 A | * | 9/1998 | Price-Francis ..... | G07C 9/00087 235/492 |
| 5,893,091 A | * | 4/1999 | Hunt ................. | G06F 17/30867 |
| 6,034,608 A | * | 3/2000 | Frank et al. ................... | 340/601 |
| 6,255,953 B1 | * | 7/2001 | Barber ................... | G08B 21/10 340/601 |
| 6,278,375 B1 | * | 8/2001 | Hucker ................. | G08B 21/10 340/601 |

(Continued)

FOREIGN PATENT DOCUMENTS

| | | |
|---|---|---|
| AU | 2004200768 | 9/2004 |
| CA | 2364018 | 6/2002 |

(Continued)

OTHER PUBLICATIONS

Website: You Need a Weather Radio: Your iPhone Can Be That (http://www.practicalistuff.com/2011/05/you-need-weather-radio-your-ip . . . ); dated May 19, 2011.

(Continued)

*Primary Examiner* — Fekadeselassie Girma
(74) *Attorney, Agent, or Firm* — Banner & Witcoff, Ltd.

(57) ABSTRACT

User-configurable weather warning apparatuses, and methods for providing and configuring user-configurable weather warning apparatuses are presented. For example, according to one aspect, an apparatus comprising a processor and a Radio Frequency (RF) receiver configured to receive a first Special Area Message Encoding (SAME) message may be provided. The processor may be configured to, responsive to a user preference to trigger an alert system only in the event of a tornado warning: determine whether the first SAME message indicates a tornado warning; and in response to determining that the first SAME message indicates a tornado warning, trigger the alert system.

34 Claims, 10 Drawing Sheets

(56) References Cited

U.S. PATENT DOCUMENTS

| | | | | |
|---|---|---|---|---|
| 6,295,001 | B1* | 9/2001 | Barber | G08B 21/10 340/601 |
| 6,310,554 | B1* | 10/2001 | Carrell | G01W 1/10 340/601 |
| 6,351,218 | B1* | 2/2002 | Smith | G01W 1/02 340/601 |
| 6,377,172 | B1* | 4/2002 | Neer | G08B 7/06 340/12.39 |
| 6,405,134 | B1 | 6/2002 | Smith et al. | |
| 6,462,665 | B1* | 10/2002 | Tarlton | G01W 1/02 340/539.1 |
| 6,581,009 | B1 | 6/2003 | Smith | |
| 6,603,405 | B2 | 8/2003 | Smith | |
| 6,646,559 | B2 | 11/2003 | Smith | |
| 6,710,715 | B2* | 3/2004 | Deeds | 340/601 |
| 6,845,324 | B2 | 1/2005 | Smith | |
| 6,963,853 | B1 | 11/2005 | Smith | |
| 7,050,784 | B2* | 5/2006 | Clark | 455/404.1 |
| 7,084,775 | B1 | 8/2006 | Smith | |
| 7,089,116 | B2 | 8/2006 | Smith | |
| 7,245,214 | B2 | 7/2007 | Smith | |
| 7,248,159 | B2 | 7/2007 | Smith | |
| 7,411,493 | B2 | 8/2008 | Smith | |
| 8,037,151 | B1* | 10/2011 | Daly | H04L 12/1895 709/207 |
| 8,179,252 | B2 | 5/2012 | Harrell | |
| 8,214,910 | B1* | 7/2012 | Gossweiler, III | H04K 1/02 455/1 |
| 8,244,216 | B1* | 8/2012 | Becker | G06Q 20/32 455/410 |
| 8,666,672 | B2* | 3/2014 | Winarski | A61B 5/16 702/19 |
| 2002/0024424 | A1* | 2/2002 | Burns | H04B 3/54 340/538 |
| 2002/0080038 | A1* | 6/2002 | Smith | G01W 1/02 340/601 |
| 2003/0076369 | A1* | 4/2003 | Resner | H04M 3/487 715/864 |
| 2003/0158815 | A1* | 8/2003 | Yoshida | G06F 21/31 705/50 |
| 2003/0215114 | A1* | 11/2003 | Kyle | G06F 21/32 382/115 |
| 2005/0171898 | A1* | 8/2005 | Bishop | G06Q 20/00 705/39 |
| 2005/0273809 | A1* | 12/2005 | Kendall | G08B 25/085 725/33 |
| 2006/0031582 | A1* | 2/2006 | Pugel | H04L 12/1895 709/246 |
| 2006/0048180 | A1* | 3/2006 | Kendall | G08B 25/085 725/33 |
| 2006/0111038 | A1* | 5/2006 | Tatsumi et al. | 455/3.01 |
| 2006/0240395 | A1* | 10/2006 | Faist | G09B 7/12 434/322 |
| 2006/0258376 | A1* | 11/2006 | Ewell, Jr. | H04M 1/66 455/456.6 |
| 2007/0061590 | A1* | 3/2007 | Boye | G06F 21/305 713/186 |
| 2007/0102527 | A1* | 5/2007 | Eubank | G08B 25/006 235/492 |
| 2007/0214023 | A1* | 9/2007 | Mathai | G01W 1/00 705/4 |
| 2007/0255963 | A1* | 11/2007 | Pizano | G06F 21/32 713/189 |
| 2008/0117041 | A1* | 5/2008 | Badoche Jacquet | G01W 1/10 340/539.28 |
| 2008/0168382 | A1* | 7/2008 | Louch | G06F 9/451 715/781 |
| 2009/0005076 | A1* | 1/2009 | Forstall | G06Q 30/02 455/456.2 |
| 2009/0041309 | A1* | 2/2009 | Kim | G06K 9/00604 382/117 |
| 2009/0164580 | A1* | 6/2009 | Schultz | G06Q 10/10 709/205 |
| 2009/0203355 | A1* | 8/2009 | Clark | G06F 21/32 455/411 |
| 2009/0316054 | A1* | 12/2009 | Bailey | G08C 19/02 348/734 |
| 2010/0174911 | A1* | 7/2010 | Isshiki | G06F 21/31 713/182 |
| 2010/0232655 | A1* | 9/2010 | Hanna | G06K 9/00604 382/117 |
| 2010/0245095 | A1* | 9/2010 | Harrell | G01W 1/00 340/601 |
| 2010/0309147 | A1* | 12/2010 | Fleizach | G06F 3/04883 345/173 |
| 2011/0045761 | A1* | 2/2011 | Rolf | H04W 4/02 455/3.06 |
| 2012/0036529 | A1* | 2/2012 | McClenny | G08B 27/005 725/33 |
| 2012/0053884 | A1* | 3/2012 | Batzler | H02J 9/08 702/122 |
| 2013/0012154 | A1* | 1/2013 | Ramos | H04L 51/20 455/404.2 |
| 2013/0205337 | A1* | 8/2013 | McClenny et al. | 725/33 |
| 2014/0241540 | A1* | 8/2014 | Hodges | H04M 1/6066 381/74 |
| 2014/0335823 | A1* | 11/2014 | Heredia | H04L 51/38 455/411 |

FOREIGN PATENT DOCUMENTS

| | | |
|---|---|---|
| CA | 2559684 | 3/2007 |
| CA | 2396312 | 3/2008 |

OTHER PUBLICATIONS

Website: App Store—Weather Alert USA (http://itunes.apple.com/us/app/weather-alert-usa/id314502416?mt=8); last viewed on Aug. 23, 2012.

Website: App Store—iMap Weather Radio (http://itunes.apple.com/us/app/imapweather-radio/id413511993?mt=8); last viewed on Aug. 23, 2012.

* cited by examiner

USER-CONFIGURABLE WEATHER WARNING APPARATUS

FIELD OF THE TECHNOLOGY

The present disclosure is generally related to a user-configurable weather warning apparatus. Specifically, aspects of the disclosure are directed to user-configurable weather warning apparatuses, and methods for providing and configuring user-configurable weather warning apparatuses.

BACKGROUND

Severe weather presents a significant risk to property and life. In particular, tornadoes, given both the magnitude of their destructive power and the limited warning available, pose a serious danger.

An agency within the United States Department of Commerce, the National Oceanic and Atmospheric Administration (NOAA), operates the NOAA Weather Radio All Hazards network of radio stations. These stations broadcast continuous weather updates based on conditions monitored by one or more local National Weather Service (NWS) offices. Radios with NOAA weather capability may be used by individuals to monitor these updates.

Specific Area Message Encoding (SAME) is a protocol utilized by the NOAA Weather Radio All Hazards network, as well as the Emergency Alert System (AES). SAME messages include digital "headers" that encode, among other information, event codes. Each of these SAME header event codes corresponds to a specific event (e.g., avalanche warning, earthquake warning, flash flood warning, tornado warning, etc.).

Individuals that desire to remain appraised of current weather conditions may utilize a radio having NOAA weather capability. Such a radio may be configured to monitor for SAME messages and switch on or switch to the appropriate channel when an alert is received. A significant issue associated with such capability, however, is the sheer number of alerts that a typical radio having NOAA weather capability may receive. Many of these alerts are of little or no concern to the average individual.

Unlike many of these alerts, tornado warnings in particular, however, are often of great concern. In geographic areas such as "tornado alley" (i.e., the region of the United States located between the Appalachian and Rocky Mountains), tornadoes are a frequent and life threatening event. In such areas, individuals routinely utilize radios having NOAA weather capability to monitor for alerts, particularly tornado warnings. Unfortunately, the volume of alerts received makes continuous monitoring impractical (e.g., while sleeping).

SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to one aspect, an apparatus comprising a processor and a Radio Frequency (RF) receiver configured to receive a first SAME message may be provided. The processor may be configured to, responsive to a user preference to trigger an alert system only in the event of a tornado warning: determine whether the first SAME message indicates a tornado warning; and in response to determining that the first SAME message indicates a tornado warning, trigger the alert system.

In some embodiments, the processor may be configured to, responsive to a user preference to trigger the alert system in the event of any alert, trigger the alert system in response to receiving the first SAME message.

In some embodiments, the processor may be configured to determine whether the first SAME message indicates a tornado warning by identifying a SAME header event code corresponding to a tornado warning within the first SAME message.

In some embodiments, the alert system may include at least one of an audible warning and a visual warning. The audible warning may include an audio message contained in the first SAME message. Additionally or alternatively, the audible warning may include an alert sound distinct from any sound contained within the first SAME message. In some embodiments, the visual warning may be of sufficient magnitude to alert a person who has a hearing impairment.

In some embodiments, the RF receiver may be configured to receive a second SAME message at a time subsequent to a time at which the first SAME message is received. The first SAME message may indicate a tornado warning. The second SAME message may not indicate a tornado warning. The processor may be configured to determine that the first SAME message indicates a tornado warning and to determine that the second SAME message does not indicate a tornado warning. In some embodiments, the processor may be configured to trigger the alert system in response to determining that the first SAME message indicates a tornado warning, and to fail to trigger the alert system in response to determining that the second SAME message does not indicate a tornado warning. In some embodiments, the processor may be configured to trigger the alert system to provide a first type of alert in response to determining that the first SAME message indicates a tornado warning, and to trigger the alert system to provide a second type of alert in response to determining that the second SAME message does not indicate a tornado warning. The first type of alert may be different from the second type of alert.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, and that the specification is not intended to be limiting in this respect.

As indicated above, a significant issue associated with continuous monitoring of weather alerts is the sheer number of alerts that a typical radio having NOAA weather capability may receive. This problem is particularly acute in areas (e.g., "tornado alley") where individuals may have a heightened interest in monitoring for such alerts. For example, an individual residing in an area prone to tornados may be more likely to desire to continuously monitor for weather alerts. At the same time, a radio having NOAA weather capability operating in such a tornado prone area is likely to receive a high volume of alerts (e.g., tornado watches, severe thunderstorm watches, severe thunderstorm warnings, etc.). The ironic effect of the confluence of these phenomena is that the individuals most likely to benefit from continuously monitoring weather alerts may be those least likely to utilize continuous monitoring. Take, for example, an individual residing in the "tornado alley" region. Such an individual, may desire to continuously monitor for weather alerts during the late evening and early morning hours (e.g., while sleeping). Because of the volume of extraneous (e.g., non-tornado warning) alerts issued in such a tornado prone area, however, continuous monitoring may be impractical (e.g., the extraneous alerts may interfere with the individual's rest).

Figure 1:
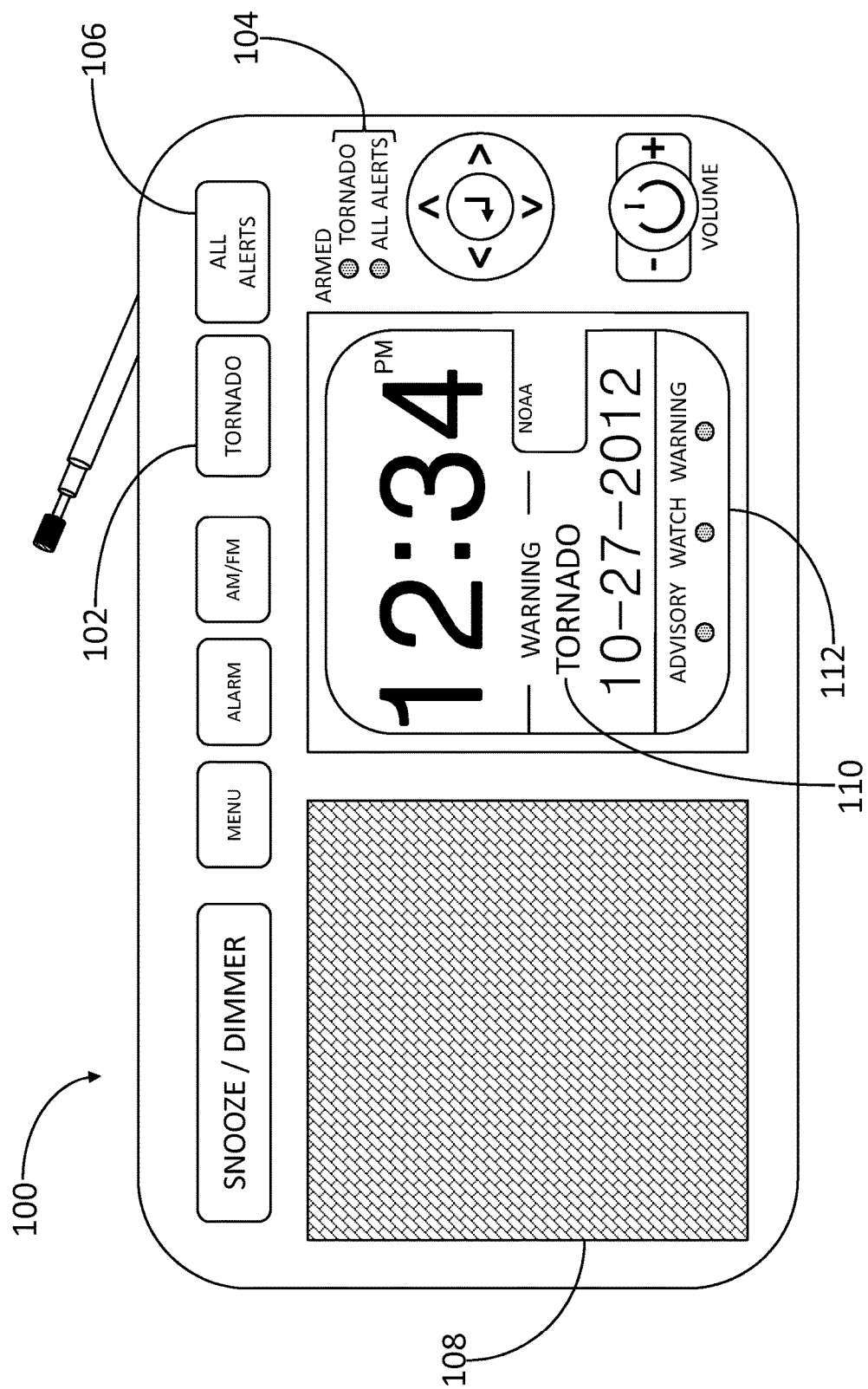
FIG. 1 illustrates an exemplary weather warning system that includes a user-configurable weather warning apparatus in accordance with one or more aspects of the disclosure.

FIG. 1 illustrates an exemplary weather warning system that includes a user-configurable weather warning apparatus in accordance with one or more aspects of the disclosure. Referring to FIG. 1, warning system 100 may include one or more buttons, switches, or menu options to enable a user to indicate a preference to only trigger an alert system in response to a tornado warning. For example, warning system 100 may include "tornado" button 102. When a user of warning system 100 presses "tornado" button 102, warning system 100 may configure itself to only trigger an alert system in response to a tornado warning. In some embodiments, warning system 100 may include a visual indicator to inform a user that warning system 100 is presently configured to only trigger an alert system in the event of a tornado warning. For example, warning system 100 may include visual indicator region 104. Visual indicator region 104 may include an indicator, for example a Light Emitting Diode (LED), corresponding to "tornado only" or "tornado warnings." Such an LED may be illuminated when warning system 100 is configured to only trigger the alert system in the event of a tornado warning. Warning system 100 may also include one or more buttons, switches, or menu options to enable a user to indicate a preference to trigger an alert system in response to any or all alerts. For example, warning system 100 may include "all alerts" button 106. When a user of warning system 100 presses "all alerts" button 106, warning system 100 may configure itself to trigger an alert system in response to any or all alerts. In some embodiments, warning system 100 may include a visual indicator to inform a user that warning system 100 is presently configured to trigger an alert system in the event of any or all alerts. For example, warning system 100 may include visual indicator region 104. Visual indicator region 104 may include an indicator, for example an LED, corresponding to "any alert" or "all alerts." Such an LED may be illuminated when warning system 100 is configured to trigger the alert system in the event of any or all alerts.

Warning system 100 may also include one or more components of an alert system for alerting a user of warning system 100 of a tornado warning or other alert. For example, warning system 100 may include speaker 108 for providing an audible warning. In some embodiments the audible warning may include an audio message contained in a SAME message associated with the alert (e.g., a recording of a NOAA official or a computer generated voice providing additional information about the alert). Additionally or alternatively, the audible warning may include a tone or warning sound generated by warning system 100 in order to capture the attention of a user of warning system 100. In some embodiments, warning system 100 may include one or more components for providing a user of warning system 100 with a visual warning. For example, warning system 100 may include a display or LED indicator 110 for providing a user of warning system 100 with a visual warning. In some embodiments, warning system 100 may include one or more components for informing a user of warning system 100 of the nature of the alert. For example, warning system 100 may include alert type indicator region 112. Alert type indicator region 112 may, for example, include one or more visual indicators (e.g., LEDs) corresponding to different possible alert types (e.g., advisory, watch, warning, etc.). In such embodiments, when an alert system associated with warning system 100 is triggered, alert type indicator region 112 may provide a user of warning system 100 with additional information pertaining to the alert that has triggered the alert system (e.g., advisory, watch, warning, etc.).

As will be described in greater detail below, in accordance with aspects of the disclosure, warning system 100 may receive a SAME message. Responsive to a user preference to trigger an alert system only in the event of a tornado warning, a processor associated with warning system 100 may determine whether the SAME message indicates a tornado warning, and, in response to determining that the SAME message indicates a tornado warning, may trigger the alert system.

Figure 2:
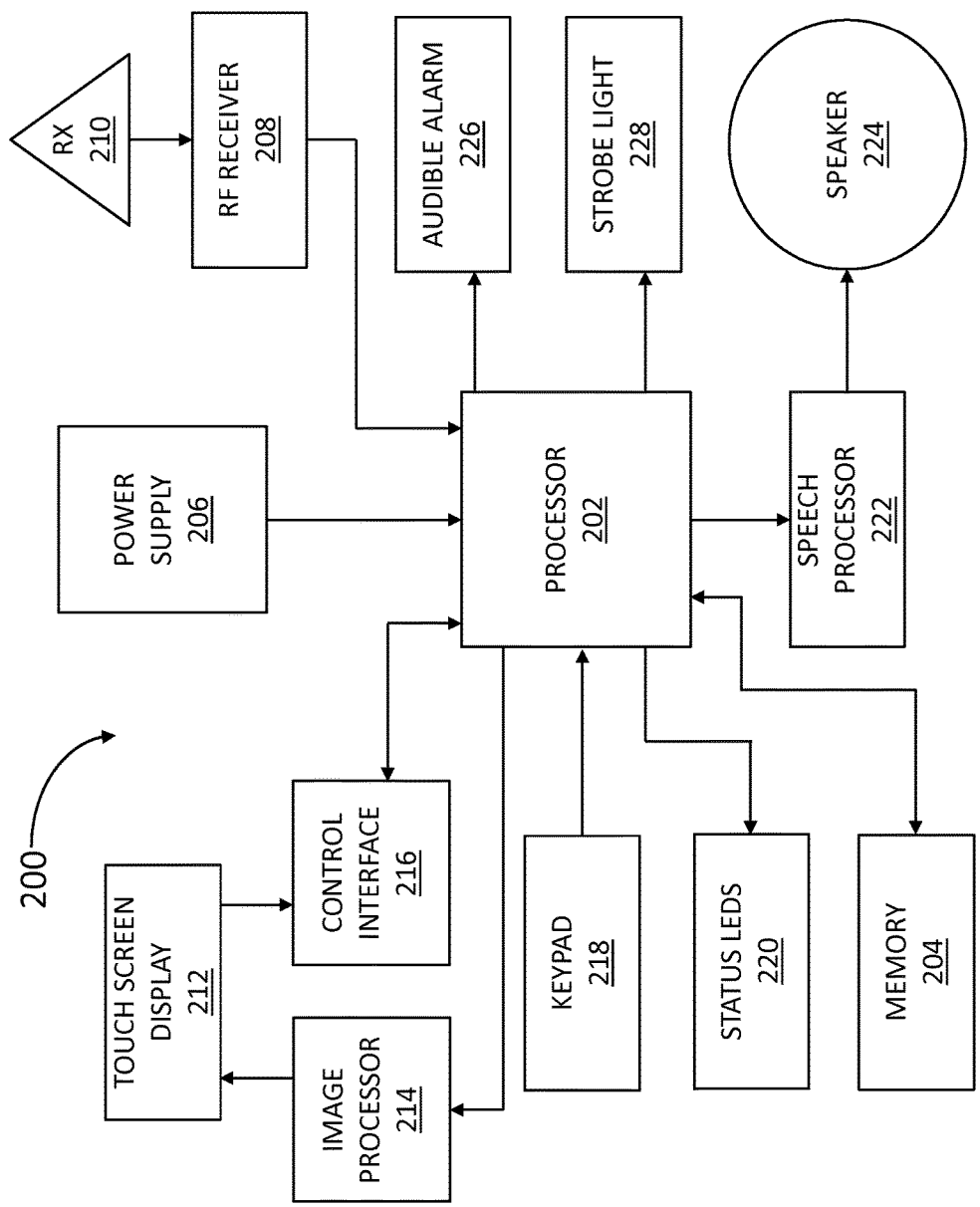
FIG. 2 illustrates an exemplary user-configurable weather warning apparatus in accordance with one or more aspects of the disclosure.

FIG. 2 illustrates an exemplary user-configurable weather warning apparatus in accordance with one or more aspects of the disclosure. Referring to FIG. 2, apparatus 200 may include one or more processors. For example, apparatus 200 may include processor 202. Processor 202 may be any processor (e.g., a microprocessor) capable of performing steps described herein. In some embodiments processor 202 may be a special purpose processor configured to perform specified predetermined steps (e.g., an Application-Specific Integrated Circuit (ASIC)). In some embodiments, processor 202 may be a general purpose processor or reconfigurable processor (e.g., a Field-Programmable Gate Array (FPGA)). Apparatus 200 may also include one or more memories. For example, apparatus 200 may include memory 204. Memory 204 may include one or more forms of volatile or non-volatile storage for storing data or instructions associated with apparatus 200. For example, memory 204 may include one or more instruction sets for configuring processor 202 to perform one or more steps described herein. Apparatus 200 may also include one or more power sources. For example, apparatus 200 may include power supply 206 for powering one or more components of apparatus 200 (e.g., processor 202). Apparatus 200 may also include one or more components for receiving messages or signals broadcast using a radio frequency. For example, apparatus 200 may include RF receiver 208. RF receiver 208 may be configured to receive messages or signals associated with one or more weather radio services via Rx interface 210 (e.g., SAME messages broadcast via the NOAA Weather Radio All Hazards network). Rx interface 210 may include one or more antennas suitable for receiving such messages or signals (e.g., an antenna suitable for receiving a signal over a VHF frequency band at 162 MHz).

Apparatus 200 may include one or more components for communicating information to and receiving information from a user of apparatus 200. For example, apparatus 200 may include a display, such as touch screen display 212. Processor 202 may utilize image processor 214 to generate images for display to a user of apparatus 200 via touch screen display 212. Processor 202 may utilize control interface 216 to receive input from a user of apparatus 200 (e.g., by receiving input generated in response to a user of apparatus 200 contacting touch screen display 212). Additionally or alternatively, apparatus 200 may include keypad 218. Keypad 218 may include one or more buttons, switches, or keys for enabling a user of apparatus 200 to convey information to processor 202. Apparatus 200 may also include one or more status indicators. For example, apparatus 200 may include status LEDs 220. Status LEDs 220 may be used to convey information to a user of apparatus 200 (e.g., information relating to the configuration of processor 202).

Apparatus 200 may include one or more components associated with an alert system. For example, apparatus 200 may include speech processor 222 and speaker 224. Speech processor 222 may be configured to decode one or more messages received via RF receiver 208 and broadcast speech encoded within such messages (e.g., a recording of a NOAA official or a computer generated voice providing information about a received alert) via speaker 224. Additionally or alternatively, apparatus 200 may include audible alarm 226. Audible alarm 226 may be a device suitable for producing an audible noise to capture the attention of a user of apparatus 200. For example, audible alarm 226 may be a buzzer or siren (e.g., a piezoelectric buzzer). Audible alarm 226 may produce an alert sound distinct from any sound contained within a received SAME message. In this respect, audible alarm 226 may be used to capture the attention of a user of apparatus 200 before broadcasting the contents of a received SAME message via speaker 224. In some embodiments, speaker 224 may broadcast a tone or warning sound in addition to or in lieu of activating audible alarm 226. Additionally or alternatively, apparatus 200 may provide a user of apparatus 200 with a visual warning. For example, touch screen display 212 may be utilized to provide a user of apparatus 200 with a visual warning. In some embodiments, apparatus 200 may include a device for producing a visual warning of sufficient magnitude to alert a person who has a hearing impairment. For example, apparatus 200 may include strobe light 228. Processor 202 may be configured to active strobe light 228 in the event of one or more specified alerts (e.g., a tornado warning).

In accordance with aspects of the disclosure, a user of apparatus 200 may utilize one or more of apparatus 200's components to configure processor 202. For example, a user of apparatus 200 may utilize touch screen display 212 or keypad 218 to indicate a preference to only trigger its alert system in response to a tornado warning. Responsive to such an indication, processor 202 may determine whether one or more SAME messages received by apparatus 200 (e.g., via RF receiver 208) indicates a tornado warning, and, in response to determining that one or more SAME messages indicates a tornado warning, may trigger the alert system.

For example, a user of apparatus 200 may desire that one or more components of apparatus 200's alert system be triggered only in the event of a tornado warning. The user may utilize one or more of apparatus 200's input means (e.g., touch screen display 212 or keypad 218) to indicate this preference. Responsive to this indication, when a SAME message is received by apparatus 200 (e.g., via RF receiver 208), processor 202 may determine whether the SAME message indicates a tornado warning. For example, processor 202 may examine the received SAME message's header. If the header contains a SAME header event code corresponding to a tornado warning (e.g., "TOR"), processor 202 may determine that the received SAME message indicates a tornado warning and may trigger the alert system. If the header fails to contain a SAME header event code corresponding to a tornado warning, processor 202 may determine that the received SAME message does not indicate a tornado warning and may fail to trigger the alert system.

Similarly, a user of apparatus 200 may desire that one or more components of apparatus 200's alert system be triggered in the event of any alert. The user may utilize one or more of apparatus 200's input means (e.g., touch screen display 212 or keypad 218) to indicate this preference. Responsive to this indication, when a SAME message is received by apparatus 200 (e.g., via RF receiver 208), processor 202 may trigger the alert system.

Under certain circumstances, a user of apparatus 200 may desire that apparatus 200's alert system be triggered to provide an alert in response to receiving a tornado warning and be triggered to provide a different type of alert in response to receiving an alert other than a tornado warning. For example, the user may desire that audible alarm 226 or strobe light 228 be activated in response to receiving a tornado warning. The user may also desire that, subsequent to the activation of audible alarm 226 or strobe light 228, speaker 224 broadcast speech encoded within messages associated with the alert (e.g., a recording of a NOAA official or a computer generated voice providing information about the alert). In contrast, the user may desire that when an alert other than a tornado warning is received, audible alarm 226 and strobe light 228 not be activated, but speaker 224 broadcast speech encoded within messages associated with the alert (e.g., a recording of a NOAA official or a computer generated voice providing information about the alert). The user may utilize one or more of apparatus 200's input means (e.g., touch screen display 212 or keypad 218) to indicate these preferences. Responsive to this indication, when a SAME message is received by apparatus 200 (e.g., via RF receiver 208), processor 202 may determine whether the SAME message indicates a tornado warning. For example, processor 202 may examine the received SAME message's header. If the header contains a SAME header event code corresponding to a tornado warning (e.g., "TOR"), processor 202 may determine that the received SAME message indicates a tornado warning and may activate audible alarm 226 or strobe light 228, and subsequently broadcast speech encoded within messages associated with the alert via speaker 224. If the header fails to contain a SAME header event code corresponding to a tornado warning, processor 202 may determine that the received SAME message does not indicate a tornado warning and may fail to activate audible alarm 226 or strobe light 228, and simply broadcast speech encoded within messages associated with the alert via speaker 224. It will be appreciated that such functionality may enable a user of apparatus 200 to continuously monitor alerts in a more effective manner. For example, the user may desire to utilize such functionality during sleeping hours. The user may decrease the volume of speaker 224 and thus not be disturbed by extraneous alerts (e.g., alerts other than tornado warnings). In the event of a tornado warning, however, the user may be notified via audible alarm 226 or strobe light 228, and may increase the volume of speaker 224 in order to receive additional information (e.g., via the broadcast of speech encoded within messages associated with the alert). In some embodiments, processor 202 may be configured to increase the volume associated with speaker 224 automatically in response to determining that the SAME message indicates a tornado warning.

Figure 3:
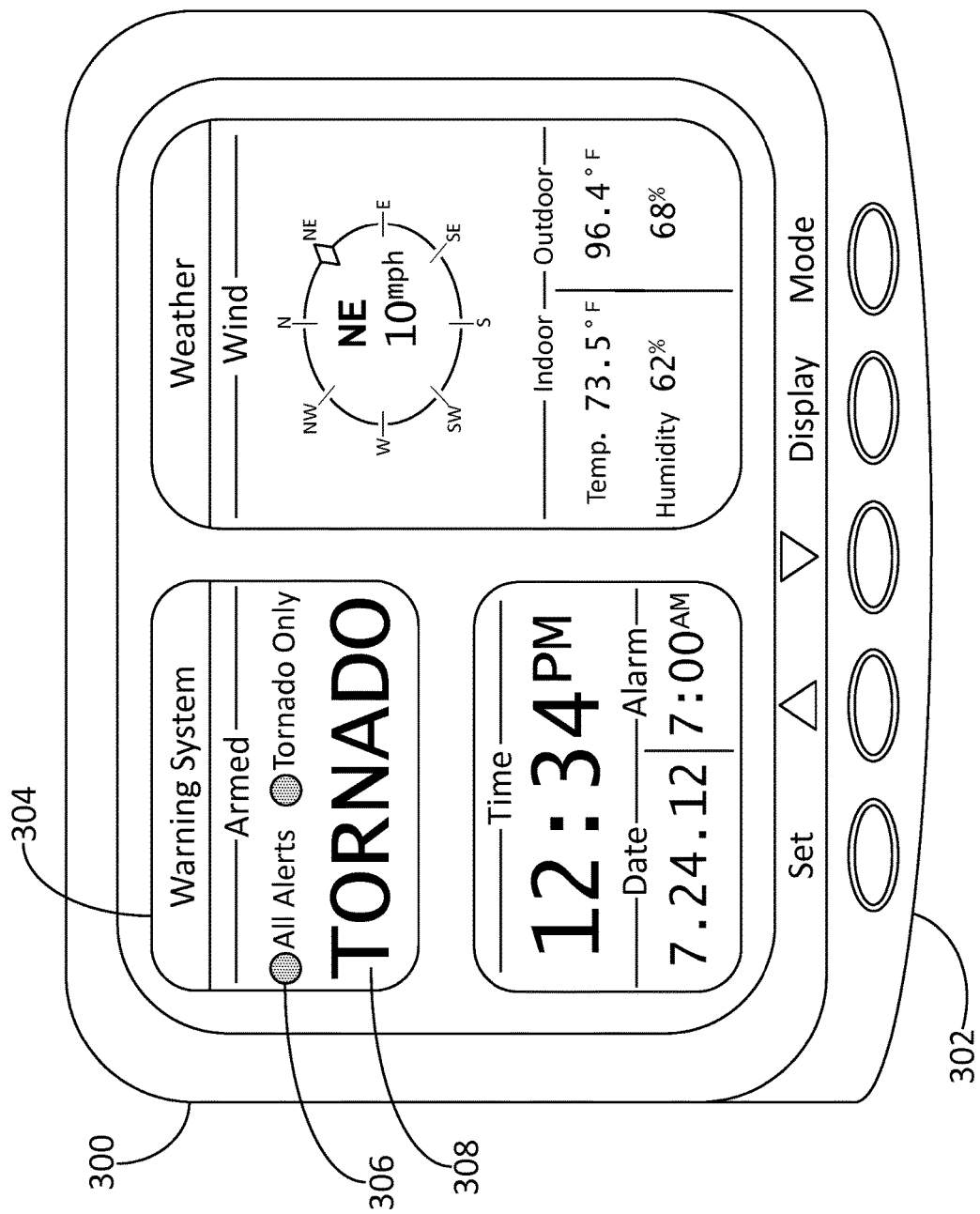
FIG. 3 illustrates an exemplary weather station having a weather warning system that includes a user-configurable weather warning apparatus in accordance with one or more aspects of the disclosure.

FIG. 3 illustrates an exemplary weather station having a weather warning system that includes a user-configurable weather warning apparatus in accordance with one or more aspects of the disclosure. Referring to FIG. 3, weather station 300 may be a "personal" weather station that provides one or more users with information regarding current weather conditions (e.g., information received via the Internet or information received via one or more weather sensors associated with weather station 300). In accordance with aspects of the disclosure, weather station 300 may include a user-configurable weather warning apparatus that includes one or more components, such as those described with respect to FIG. 2. For example, weather station 300 may include keypad 302. Keypad 302 may be utilized by a user of weather station 300 to indicate one or more preferences regarding the user-configurable weather warning apparatus of weather station 300 (e.g., whether one or more components of an alert system should be triggered only in response to an alert indicating a tornado warning or in response to any alert). Weather station 300 may also include warning system display portion 304. Warning system display portion 304 may include visual indicator region 306 for indicating one or more preferences regarding the user-configurable weather warning apparatus of weather station 300 (e.g., whether one or more components of an alert system will be triggered only in response to an alert indicating a tornado warning or in response to any alert). Warning system display portion 304 may also include visual indictor 308 for providing a user of weather station 300 with a visual warning in the event of an alert (e.g., "TORNADO" in the event of an alert indicating a tornado warning). Weather station 300 may also include one or more speakers or audible alarms (not illustrated) for capturing the attention of a user of weather station 300 when an alert is received or broadcasting information associated with a received alert (e.g., a recording of a NOAA official or a computer generated voice providing information about the alert).

Figure 4:
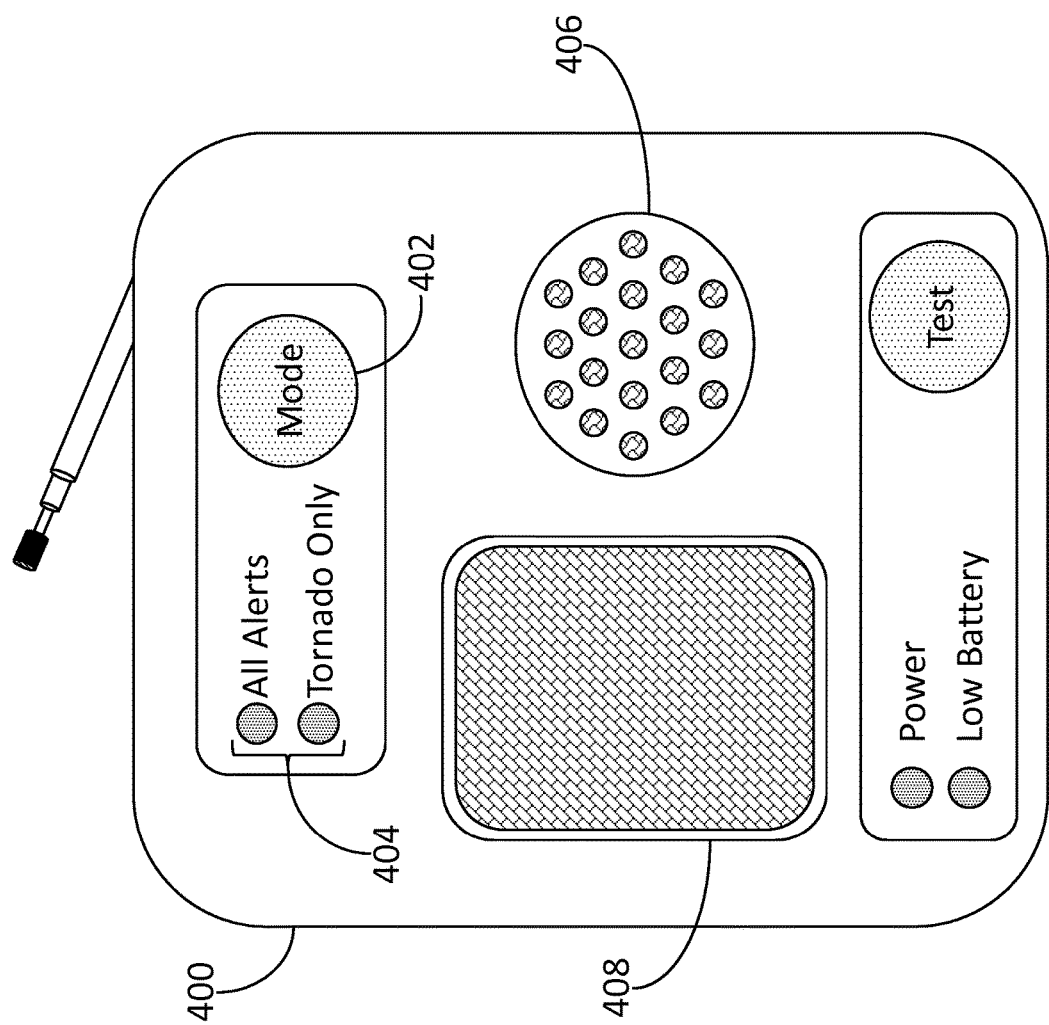
FIG. 4 illustrates an exemplary dedicated purpose weather warning system that includes a user-configurable weather warning apparatus in accordance with one or more aspects of the disclosure.

FIG. 4 illustrates an exemplary dedicated purpose weather warning system that includes a user-configurable weather warning apparatus in accordance with one or more aspects of the disclosure. Referring to FIG. 4, dedicated purpose weather warning system 400 may be a device dedicated to providing weather warnings (e.g., a device akin to a smoke alarm or carbon monoxide detector). In accordance with aspects of the disclosure, dedicated purpose weather warning system 400 may include a user-configurable weather warning apparatus that includes one or more components, such as those described with respect to FIG. 2. For example, dedicated purpose weather warning system 400 may include mode button 402. Mode button 402 may be utilized by a user of dedicated purpose weather warning system 400 to indicate one or more preferences regarding the user-configurable weather warning apparatus of dedicated purpose weather warning system 400 (e.g., whether one or more components of an alert system should be triggered only in response to an alert indicating a tornado warning or in response to any alert). Dedicated purpose weather warning system 400 may also include visual indicator region 404. Visual indicator region 404 may include one or more visual indicators (e.g., LEDs) for indicating one or more preferences regarding the user-configurable weather warning apparatus of dedicated purpose weather warning system 400 (e.g., whether one or more components of an alert system will be triggered only in response to an alert indicating a tornado warning or in response to any alert). Dedicated purpose weather warning system 400 may also include visual indictor 406 (e.g., a strobe light) for providing a user of dedicated purpose weather warning system 400 with a visual warning in the event of an alert. Dedicated purpose weather warning system 400 may also include speaker 408 or one or more audible alarms (not illustrated) for capturing the attention of a user of dedicated purpose weather warning system 400 when an alert is received or broadcasting information associated with a received alert (e.g., a recording of a NOAA official or a computer generated voice providing information about the alert).

Figure 5:
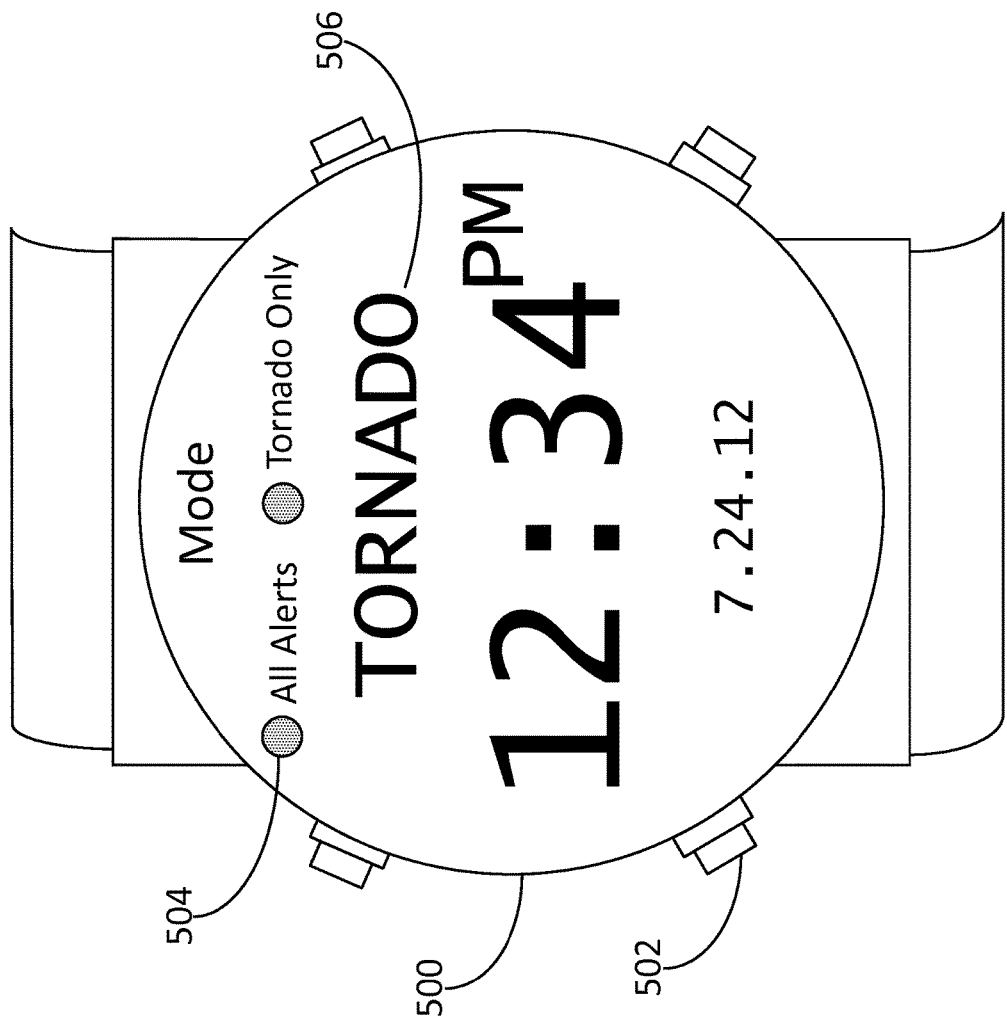
FIG. 5 illustrates an exemplary wearable weather warning system that includes a user-configurable weather warning apparatus in accordance with one or more aspects of the disclosure.

FIG. 5 illustrates an exemplary wearable weather warning system that includes a user-configurable weather warning apparatus in accordance with one or more aspects of the disclosure. Referring to FIG. 5, wearable weather warning system 500 may be a "wearable" device (e.g., a watch). In accordance with aspects of the disclosure, wearable weather warning system 500 may include a user-configurable weather warning apparatus that includes one or more components, such as those described with respect to FIG. 2. For example, wearable weather warning system 500 may include button 502. Button 502 may be utilized by a user of wearable weather warning system 500 to indicate one or more preferences regarding the user-configurable weather warning apparatus of wearable weather warning system 500 (e.g., whether one or more components of an alert system should be triggered only in response to an alert indicating a tornado warning or in response to any alert). Wearable weather warning system 500 may also include visual indicator region 504 for indicating one or more preferences regarding the user-configurable weather warning apparatus of wearable weather warning system 500 (e.g., whether one or more components of an alert system will be triggered only in response to an alert indicating a tornado warning or in response to any alert). Wearable weather warning system 500 may also include visual indictor 506 for providing a user of wearable weather warning system 500 with a visual warning in the event of an alert (e.g., "TORNADO" in the event of an alert indicating a tornado warning). Wearable weather warning system 500 may also include one or more speakers or audible alarms (not illustrated) for capturing the attention of a user of wearable weather warning system 500 when an alert is received or broadcasting information associated with a received alert (e.g., a recording of a NOAA official or a computer generated voice providing information about the alert).

Figure 6:
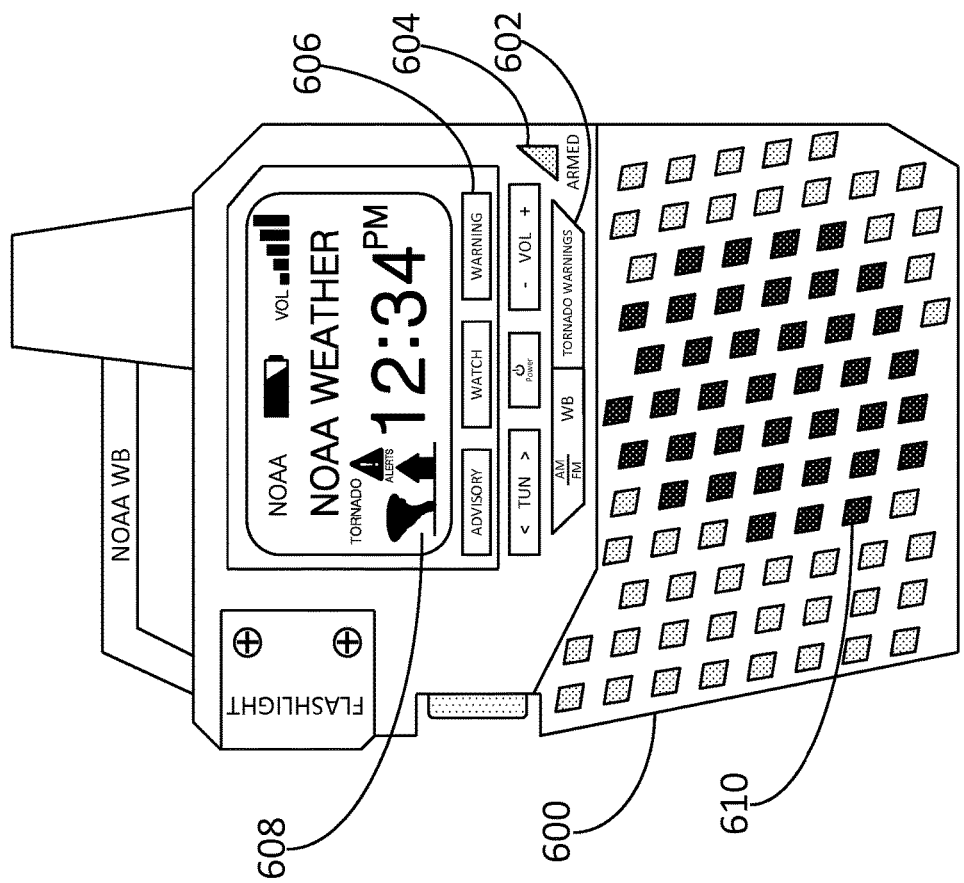
FIG. 6 illustrates an exemplary portable weather warning system that includes a user-configurable weather warning apparatus in accordance with one or more aspects of the disclosure.

FIG. 6 illustrates an exemplary portable weather warning system that includes a user-configurable weather warning apparatus in accordance with one or more aspects of the disclosure. Referring to FIG. 6, portable weather warning system 600 may be any portable device (e.g., a handheld radio). In accordance with aspects of the disclosure, portable weather warning system 600 may include a user-configurable weather warning apparatus that includes one or more components, such as those described with respect to FIG. 2. For example, portable weather warning system 600 may include button 602. Button 602 may be utilized by a user of portable weather warning system 600 to indicate one or more preferences regarding the user-configurable weather warning apparatus of portable weather warning system 600 (e.g., whether one or more components of an alert system should be triggered only in response to an alert indicating a tornado warning or in response to any alert). Portable weather warning system 600 may also include visual indicator 604 for indicating one or more preferences regarding the user-configurable weather warning apparatus of portable weather warning system 600 (e.g., whether one or more components of an alert system will be triggered only in response to an alert indicating a tornado warning or in response to any alert). Portable weather warning system 600 may further include visual indicator region 606 for informing a user of portable weather warning system 600 of the nature of the alert (e.g., advisory, watch, warning, etc.). Portable weather warning system 600 may also include visual indictor 608 for providing a user of portable weather warning system 600 with a visual warning in the event of an alert. Portable weather warning system 600 may further include speaker 610 or one or more audible alarms (not illustrated) for capturing the attention of a user of portable weather warning system 600 when an alert is received or broadcasting information associated with a received alert (e.g., a recording of a NOAA official or a computer generated voice providing information about the alert).

Figure 7:
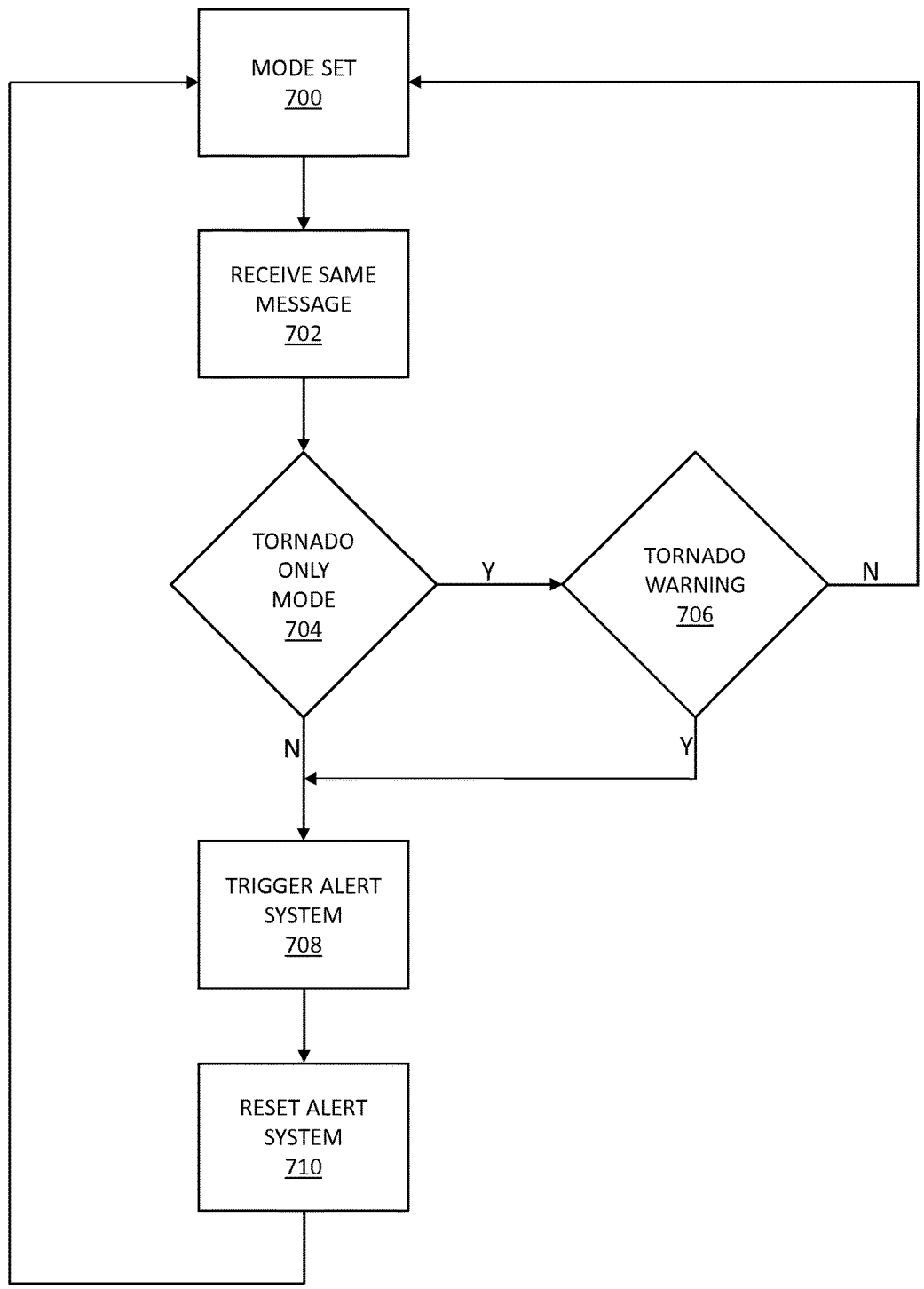
FIG. 7 illustrates exemplary methods for providing and configuring user-configurable weather warning apparatuses in accordance with one or more aspects of the disclosure.

FIG. 7 illustrates exemplary methods for providing and configuring user-configurable weather warning apparatuses in accordance with one or more aspects of the disclosure. Referring to FIG. 7, at step 700, a user of a user-configurable weather warning apparatus may set a mode for the user-configurable weather warning apparatus. For example, a user of apparatus 200 may utilize touch screen display 212 or keypad 218 to indicate a preference to trigger apparatus 200's alert system only in the event of a tornado warning. At step 702, a SAME message may be received. For example, RF receiver 208 may receive a SAME message via Rx interface 210. At step 704, a determination may be made as to whether the user-configurable weather warning apparatus is set to a "tornado only" mode. For example, processor 202 may determine that apparatus 200 is set to a "tornado only" mode due to the preference indicated, at step 700, by the user of apparatus 200 to trigger apparatus 200's alert system only in the event of a tornado warning. In response to determining that the user-configurable weather warning apparatus is set to a "tornado only" mode, at step 706, a determination may be made as to whether the received SAME message indicates a tornado warning. For example, processor 202 may examine the received SAME message's header to determine whether the header contains a SAME header event code corresponding to a tornado warning (e.g., "TOR").

In response to determining that the received SAME message indicates a tornado warning, at step 708, the alert system may be triggered. For example, in response to processor 202 determining that the received SAME message's header contains a SAME header event code corresponding to a tornado warning, processor 202 may trigger one or more of speech processor 222, speaker 224, audible alarm 226, and strobe light 228. At step 710, the alert system may be reset. For example, after the one or more of speech processor 222, speaker 224, audible alarm 226, and strobe light 228 has been acknowledged by a user of apparatus 200 or a specified period of time has lapsed, the alert system may be reset. Returning to step 706, in response to determining that the received SAME message does not indicate a tornado warning, the method may return to step 700. Returning to step 704, in response to determining that the user-configurable weather warning apparatus is not set to a "tornado only" mode (e.g., to an "all alerts" mode), at step 708, the alert system may be triggered. For example, at step 700, rather than a user of apparatus 200 utilizing touch screen display 212 or keypad 218 to indicate a preference to trigger apparatus 200's alert system only in the event of a tornado warning, the user may have utilized touch screen display 212 or keypad 218 to indicate a preference to trigger apparatus 200's alert system in the event of any alert, and processor 202 may trigger one or more of speech processor 222, speaker 224, audible alarm 226, and strobe light 228. As indicated above, at step 710, the alert system may be reset. For example, after the one or more of speech processor 222, speaker 224, audible alarm 226, and strobe light 228 has been acknowledged by a user of apparatus 200 or a specified period of time has lapsed, the alert system may be reset.

Figure 8:
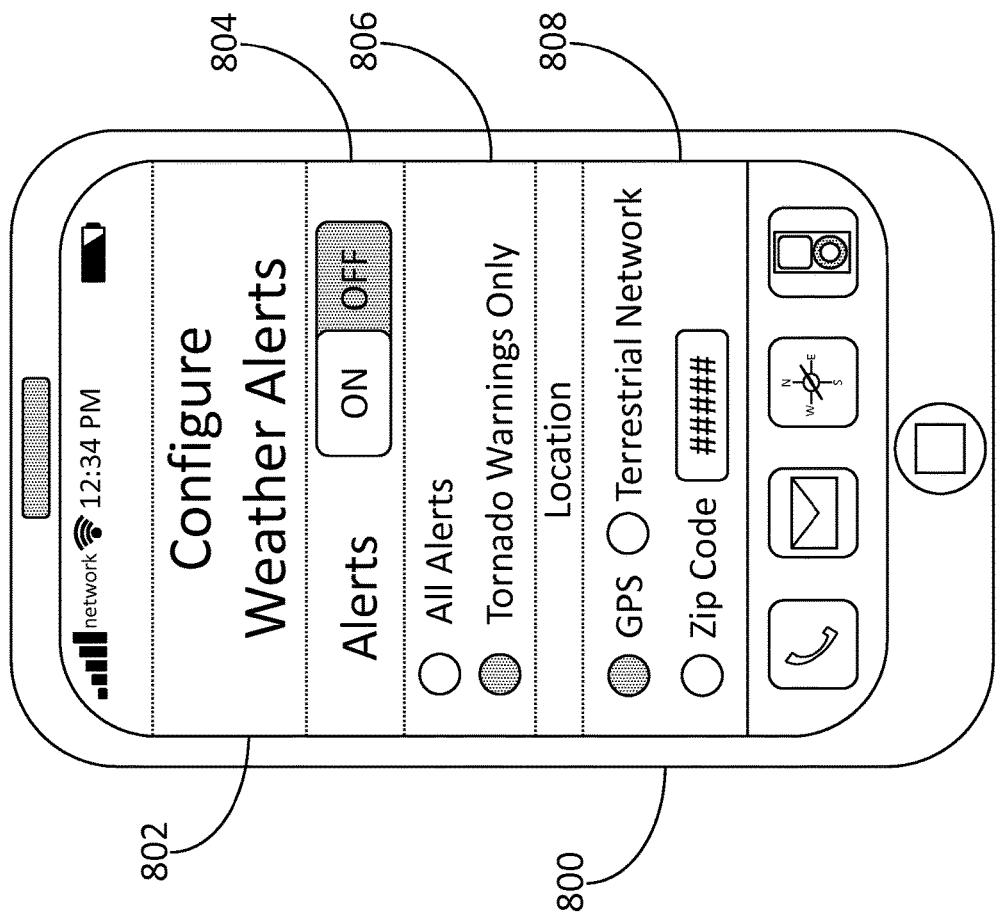
FIG. 8 illustrates an exemplary mobile device running an application for providing user-configurable weather warnings in accordance with one or more aspects of the disclosure.

FIG. 8 illustrates an exemplary mobile device running an application for providing user-configurable weather warnings in accordance with one or more aspects of the disclosure. Referring to FIG. 8, mobile device 800 may be any mobile computing platform (e.g., a smartphone, tablet computer, etc.). Mobile device 800 may include an application for providing weather alerts and such an application may include user interface (UI) 802. UI 802 may include one or more user-selectable options. For example, UI 802 may include user-selectable option 804 for turning mobile device 800's weather alert system on or off. UI 802 may also include user-selectable option 806 for indicating a user preference to trigger mobile device 800's alert system in the event of any weather alert or only in the event of a tornado warning. In some embodiments, UI 802 may include one or more user-selectable options for designating how mobile device 800's location should be determined. For example, UI 802 may include user-selectable option 808 for allowing a user of mobile device 800 to designate that mobile device 800's location should be determined using one or more of a zip code provided by a user of mobile device 800, a location determined using a global positioning system (GPS) receiver associated with mobile device 800, or a location determined using a terrestrial radio network receiver associated with mobile device 800.

In accordance with aspects of the disclosure, responsive to a user of mobile device 800 initiating (or "turning on") mobile device 800's weather alert system (e.g., via user-selectable option 804), a process thread for monitoring weather alerts may be created and executed on one or more processors of mobile device 800. In order to prevent or mitigate accidental termination of the process thread by a user or another application executing on mobile device 800, the process thread may be uninterruptable or unaffected by application or system interrupts.

As mobile device 800 receives weather alerts, the process thread may determine whether an alert system associated with mobile device 800 should be triggered. For example, if a user of mobile device 800 has indicated that the alert system should be triggered in response to all weather alerts received (e.g., via user-selectable option 806), the process thread may trigger the alert system upon receiving a new weather alert. Similarly, if a user of mobile device 800 has indicated that the alert system should be triggered in response to only weather alerts received that indicate a tornado warning (e.g., via user-selectable option 806), the process thread may determine whether one or more of the received weather alerts indicates a tornado warning, and responsive to determining that one or more of the received weather alerts indicates a tornado warning, the process thread may trigger the alert system.

The alert system associated with mobile device 800 may include one or more of a visual or audible indicator. For example, a speaker associated with mobile device 800 may be configured to produce one or more audible sounds for capturing the attention of a user of mobile device 800 when an alert is received or may broadcast information associated with a received alert (e.g., a recording of a NOAA official or a computer generated voice providing information about the alert). In some embodiments, mobile device 800 may utilize its UI to provide a visual weather warning to its user.

Figure 9:
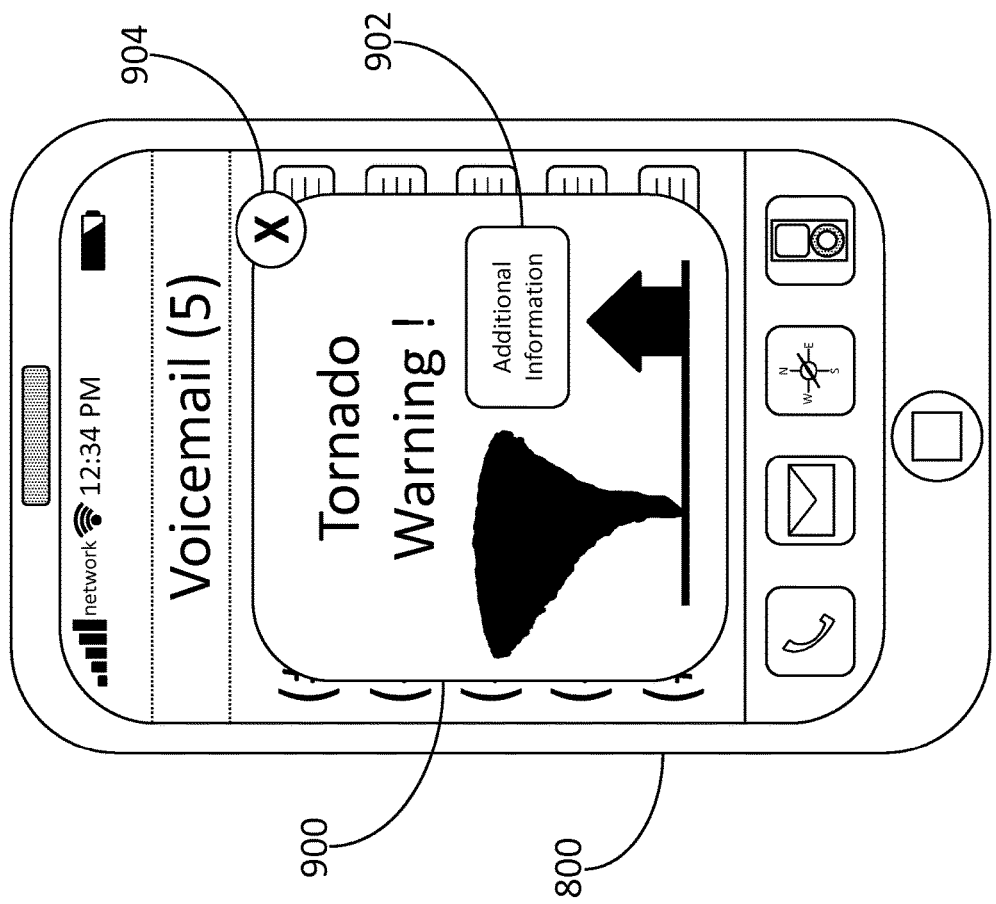
FIG. 9 illustrates an exemplary mobile device providing a weather warning in accordance with one or more aspects of the disclosure.

FIG. 9 illustrates an exemplary mobile device providing a weather warning in accordance with one or more aspects of the disclosure. Referring to FIG. 9, weather warning 900 may overlay one or more UI elements presently being (or last) utilized by the user. Weather warning 900 may indicate the nature of the alert (e.g., "Tornado Warning!"). In some embodiments, weather warning 900 may include additional information about the weather alert or a link to additional information about the weather alert. For example, weather warning 900 may include additional information link 902 which may be any UI element that when selected by the user provides additional information regarding the weather alert. In some embodiments, weather warning 900 may include one or more options for acknowledging the weather alert. For example, weather warning 900 may include close button 904 which may be used to acknowledge the weather alert or remove weather warning 900 from mobile device 800's active UI. It will be appreciated, that due to the uninterruptable configuration of the process thread for monitoring weather alerts, acknowledging weather warning 900 (e.g., via close button 904) will have no effect on the process thread, which will continue to monitor for additional weather alerts.

Figure 10:
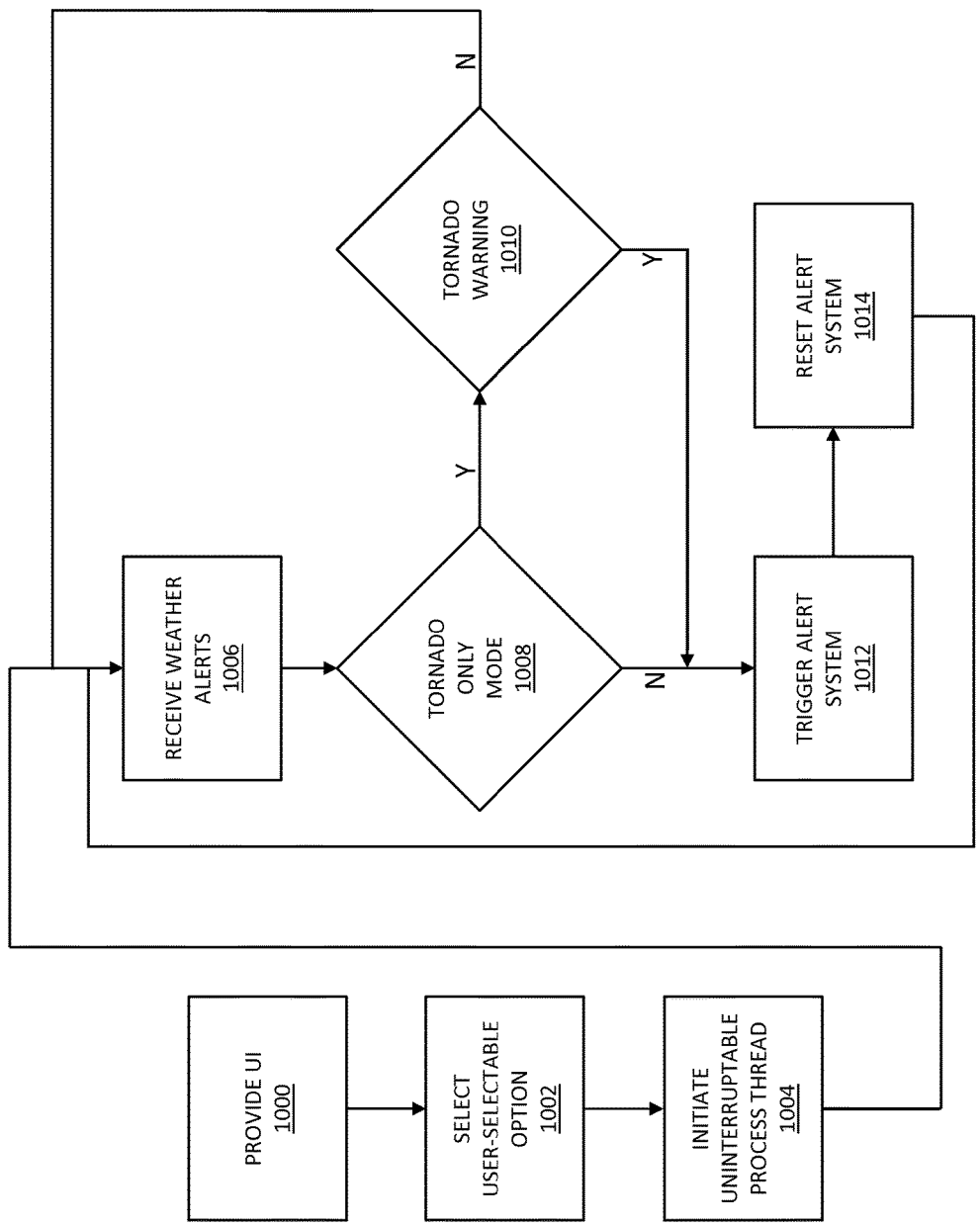
FIG. 10 illustrates exemplary methods for providing and configuring user-configurable weather warnings on a mobile device in accordance with one or more aspects of the disclosure.

FIG. 10 illustrates exemplary methods for providing and configuring user-configurable weather warnings on a mobile device in accordance with one or more aspects of the disclosure. Referring to FIG. 10, at step 1000, a UI associated with a weather warning application may be provided to a user of a mobile device. For example, UI 802 may be provided to a user of mobile device 800. At step 1002, a user may select a user-selectable option indicating when an alert system associated with the mobile device should be triggered. For example, a user of mobile device 800 may utilize user-selectable option 806 to indicate that an alert system associated with mobile device 800 should be triggered only in the event of a tornado warning. At step 1004, an uninterruptable process thread for monitoring weather alerts may be initiated. For example, a process thread for monitoring weather alerts may be initiated on one or more processors of mobile device 800. The process thread for monitoring weather alerts may be configured to be unaffected by application or system interrupts. At step 1006, weather alerts are received. For example, mobile device 800 may receive one or more weather alerts.

At step 1008, a determination may be made as to whether the user has indicated a preference to trigger the alert system only in the event of a tornado warning. For example, based on the user of mobile device 800's selection via user-selectable option 806, it may be determined that the alert system associated with mobile device 800 should only be triggered in the event of a tornado warning. At step 1010, a determination may be made as to whether one or more of the received weather alerts indicates a tornado warning. For example, the process thread for monitoring weather alerts may determine that one or more of the received weather alerts indicates a tornado warning. At step 1012, the alert system may be triggered. For example, weather warning 900 may be displayed on mobile device 800's UI. At step 1014, the alert system may be reset. For example, a user of mobile device 800 may acknowledge weather warning 900 (e.g., via close button 904) or a specified period of time may pass. Returning to step 1010, the process thread for monitoring weather alerts may determine that none of the received weather alerts indicate a tornado warning, and the process thread may fail to trigger the alert system and continue to monitor for additional weather alerts. Returning to step 1008, based on the user of mobile device 800's selection via user-selectable option 806, it may be determined that the alert system associated with mobile device 800 should be triggered in the event of any alert and, at step 1012, the alert system may be triggered. For example, at step 1002, a user of mobile device 800 may utilize user-selectable option 806 to indicate that an alert system associated with mobile device 800 should be triggered in the event of any alert. As indicated above, at step 1014, the alert system may be reset. For example, a user of mobile device 800 may acknowledge weather warning 900 (e.g., via close button 904) or a specified period of time may pass.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device.

The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
    providing an apparatus comprising:
        a radio frequency (RF) receiver;
        an alert system configured to provide alerts for one or more events in a first set of events; and
        a display screen configured to display a graphical user interface comprising a first user-selectable option associated with a first event, a second user-selectable option associated with a second event, and a plurality of different alert types; and
    configuring the apparatus to:
        receive one or more user inputs selecting a first alert type for the first event and second alert type for the second event;
        receive, from one or more sensors, weather data;
        output, to a first display portion of the display screen, the weather data received from the one or more sensors;
        output, to a second display portion of the display screen, data associated with the one or more inputs;
        receive, via the RF receiver, a specific area message encoding (SAME) message;
        determine whether the SAME message indicates the first event or the second event, wherein:
            responsive to a determination that the SAME message indicates the first event, trigger the alert system to output an alert of the first alert type; and
            responsive to a determination that the SAME message indicates the second event, trigger the alert system to output an alert of the second alert type.

2. The method of claim 1, wherein the alert system is configured to produce an audible warning.

3. The method of claim 2, wherein the audible warning comprises an audio message encoded in the SAME message.

4. The method of claim 3, wherein the audible warning comprises an alert sound distinct from the audio message.

5. The method of claim 1, comprising configuring the apparatus to, output a visual warning associated with one of the first event or the second event to the display screen.

6. The method of claim 1, comprising configuring the apparatus to, output a link to the display screen, the link, when selected, provides additional information regarding one of the first event or the second event.

7. The method of claim 6, wherein the one or more user inputs are received via the display screen.

8. The method of claim 6, wherein the apparatus comprises one or more visual indicators, the method comprising configuring the apparatus to:
    responsive to the determination that the SAME message indicates a tornado warning, indicate, via the one or more visual indicators, that the SAME message indicates a tornado warning; and
    responsive to the determination that the SAME message indicates an event other than a tornado warning, indicate, via the one or more visual indicators, that the SAME message indicates an event other than a tornado warning.

9. The method of claim 1, wherein the apparatus comprises a speaker, the method comprising configuring the apparatus to, responsive to the determination that the SAME message indicates a tornado warning, automatically increase a volume level associated with the speaker.

10. The method of claim 1, wherein determining whether the SAME message indicates the first event or the second event comprises analyzing a header of the SAME message.

11. The method of claim 10, comprising configuring the apparatus to, indicate that the apparatus is set to an option to trigger the alert system in response to a tornado warning and one or more events other than a tornado warning.

12. The method of claim 1, wherein the apparatus comprises a wearable device, and wherein the configuring comprises configuring the wearable device.

13. The method of claim 12, wherein the wearable device comprises a watch, and wherein configuring the wearable device comprises configuring the watch.

14. The method of claim 1, wherein the apparatus comprises a personal weather station configured to provide information regarding current weather conditions, and wherein the configuring comprises configuring the personal weather station.

15. The method of claim 14, comprising configuring the personal weather station to receive, via the Internet, the information regarding current weather conditions.

16. The method of claim 14, comprising configuring the personal weather station to receive, via one or more sensors associated with the personal weather station, the information regarding current weather conditions.

17. The method of claim 1, wherein the apparatus further comprises a display, and the apparatus is further configured to output, to the display, an interface element that when selected, provides information related to a tornado warning.

18. An apparatus, comprising:
a radio frequency (RF) receiver;
an alert system configured to provide alerts for one or more events in a first set of events; and
a display screen configured to display a graphical user interface comprising a first user-selectable option associated with a first event, a second user-selectable option associated with a second event, and a plurality of different alert types, wherein the apparatus is configured to:
receive one or more user inputs selecting a first alert type for the first event and a second alert type for the second event;
receive, from one or more sensors, weather data;
output, to a first display portion of the display screen, the weather data received from the one or more sensors;
output, to a second display portion of the display screen, data associated with the one or more user inputs;
receive, via the RF receiver, a specific area message encoding (SAME) message;
determine whether the SAME message indicates the first event or the second event, wherein,
responsive to a determination that the SAME message indicates the first event, trigger the alert system to output an alert of the first alert type; and
responsive to a determination that the SAME message indicates the second event, trigger the alert system to output an alert of the second alert type.

19. The apparatus of claim 18, wherein the alert system is configured to produce an audible warning.

20. The apparatus of claim 19, wherein the audible warning comprises an audio message encoded in the SAME message.

21. The apparatus of claim 20, wherein the audible warning comprises an alert sound distinct from the audio message.

22. The apparatus of claim 18, wherein the apparatus is configured to output a visual warning associated with one of the first event or the second event to the display screen.

23. The apparatus of claim 18, wherein the apparatus is configured to output a link to the display screen, the link, when selected, provides additional information regarding one of the first event or the second event.

24. The apparatus of claim 23, wherein the one or more user inputs are received via the display screen.

25. The apparatus of claim 23, wherein the apparatus comprises one or more visual indicators, and wherein the apparatus is configured to:
responsive to the determination that the SAME message indicates a tornado warning, indicate, via the one or more visual indicators, that the SAME message indicates a tornado warning; and
responsive to the determination that the SAME message indicates an event other than a tornado warning, indicate, via the one or more visual indicators, that the SAME message indicates an event other than a tornado warning.

26. The apparatus of claim 18, wherein the apparatus comprises a speaker, and wherein the apparatus is configured to, responsive to the determination that the SAME message indicates a tornado warning, automatically increase a volume level associated with the speaker.

27. The apparatus of claim 18, determining whether the SAME message indicates the first event or the second event comprises analyzing a header of the SAME message.

28. The apparatus of claim 27, wherein the apparatus is configured to indicate that the apparatus is set to the option to trigger the alert system in response to a tornado warning and one or more events other than a tornado warning.

29. The apparatus of claim 18, wherein the apparatus comprises a wearable device.

30. The apparatus of claim 29, wherein the wearable device comprises a watch.

31. The apparatus of claim 18, wherein the apparatus comprises a personal weather station configured to provide information regarding current weather conditions.

32. The apparatus of claim 31, wherein the personal weather station is configured to receive, via the Internet, the information regarding current weather conditions.

33. The apparatus of claim 31, wherein the personal weather station is configured to receive, via one or more sensors associated with the personal weather station, the information regarding current weather conditions.

34. The apparatus of claim 18, further comprising a display, and further configured to output, to the display, an interface element that when selected, provides information related to a tornado warning.

* * * * *